(12) United States Patent
Le Neindre et al.

(10) Patent No.: US 7,908,070 B2
(45) Date of Patent: Mar. 15, 2011

(54) METHOD FOR CONTROLLING A COUPLING DEVICE BETWEEN AN INPUT SHAFT AND AN OUTPUT SHAFT

(75) Inventors: Yvan Le Neindre, Paris (FR); Gaetan Rocq, La Boissiere-Ecole (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 653 days.

(21) Appl. No.: 11/993,853

(22) PCT Filed: Jun. 23, 2006

(86) PCT No.: PCT/FR2006/050626
§ 371 (c)(1),
(2), (4) Date: Dec. 21, 2007

(87) PCT Pub. No.: WO2007/000553
PCT Pub. Date: Jan. 4, 2007

(65) Prior Publication Data
US 2010/0161189 A1    Jun. 24, 2010

(30) Foreign Application Priority Data

Jun. 27, 2005   (FR) ..................................... 05 06513

(51) Int. Cl.
*G06F 7/02*       (2006.01)
*G06F 17/17*      (2006.01)
*F16D 13/75*      (2006.01)

(52) U.S. Cl. ........................... 701/68; 701/67; 192/111.1

(58) Field of Classification Search ..................... 701/67, 701/68; 477/72, 98; 192/82 T, 70.252, 111.1–111.7
See application file for complete search history.

(56) References Cited

U.S. PATENT DOCUMENTS
5,119,695 A  *  6/1992   Milunas et al. .................. 477/98
(Continued)

FOREIGN PATENT DOCUMENTS
DE           19652244 A1      6/1997
(Continued)

OTHER PUBLICATIONS
International Search Report mailed Mar. 15, 2007 in PCT/FR2006/050626.

*Primary Examiner* — Khoi Tran
*Assistant Examiner* — Jason Holloway
(74) *Attorney, Agent, or Firm* — Nicolas E. Seckel

(57) ABSTRACT

The invention relates to a method for controlling a coupling device between an input shaft driven by a motor and an output shaft that can transmit a maximum torque according to the position of an actuator of the coupling device 5 complying with a law of behavior of the coupling means according to which: a set value (Cemb,cons) of maximum torque to be transmitted is defined; the actual position (Xemb,mes) of the actuator of the coupling device is measured; a set value (Xemb,cons) is determined for actuating the coupling device and is sent to the actuator of the coupling device, while using a law of behavior of the coupling means obtained by interpolation between a first law of reference of behavior of the coupling means and at least one second law of reference of behavior of the coupling means, and; an auto-adaptation of the law of behavior of the coupling means is carried out for taking into consideration its evolution resulting from the use. The method can be used for controlling the clutch of a drive train of a motor vehicle.

13 Claims, 3 Drawing Sheets

U.S. PATENT DOCUMENTS

| | | | | |
|---|---|---|---|---|
| 5,871,419 | A * | 2/1999 | Amendt | 477/180 |
| 7,054,732 | B2 * | 5/2006 | Rieger et al. | 701/67 |
| 7,158,873 | B2 * | 1/2007 | Eich et al. | 701/68 |
| 7,603,219 | B2 * | 10/2009 | Joshi et al. | 701/68 |
| 2002/0117339 | A1 * | 8/2002 | Nakashima | 180/65.4 |
| 2004/0064232 | A1 * | 4/2004 | Eich et al. | 701/68 |
| 2005/0182547 | A1 * | 8/2005 | Sah et al. | 701/67 |
| 2007/0294017 | A1 * | 12/2007 | Joshi et al. | 701/67 |
| 2008/0147285 | A1 * | 6/2008 | Joshi et al. | 701/67 |
| 2010/0167870 | A1 * | 7/2010 | Le Neindre et al. | 477/5 |

FOREIGN PATENT DOCUMENTS

| | | |
|---|---|---|
| EP | 1437520 A | 7/2004 |
| EP | 1510717 A | 3/2005 |

* cited by examiner

METHOD FOR CONTROLLING A COUPLING DEVICE BETWEEN AN INPUT SHAFT AND AN OUTPUT SHAFT

BACKGROUND ART

The present invention relates to the control of a coupling device between an input shaft driven by a motor and an output shaft that can transmit a maximum torque based on the position of an actuator of the coupling device, in accordance with a law of behavior of the coupling means.

A hybrid traction drive—for example, composed of a heat engine coupled to an electrical machine via a clutch, and which drives an input shaft of a gearbox, which itself drives the wheels of a motor vehicle—must have torque control for the engine members, i.e., the heat engine and the electrical machine, in order to best meet the driver's demand, expressed in terms of torques to apply at the wheel.

In a hybrid traction drive, the torque to apply at the wheel is distributed between the heat engine and the electrical machine based on the specific operating conditions of the vehicle, in particular to optimize the energy consumption of the traction drive.

In order to control this assembly, the distribution of torque must be varied between the heat engine and the electrical machine. This entails being able to couple and decouple the heat engine and the electrical machine with a coupling means between the heat engine and the electrical machine. This coupling member, which is generally a friction clutch, must be controlled in such a way that the torque transmitted by the clutch is precisely ascertained, at least during periods when the clutch is sliding.

Conventional traction drives also have coupling/decoupling means that can be controlled. When the coupling/decoupling means are controlled, the transmitted torque must also be controlled, particularly upon starting or changing gearbox ratios.

In order to properly control such a device, one must precisely formulate a clutch operation law that can determine the relation between the position of an actuator of the clutch and the maximum torque that the clutch can transmit during the time it is sliding.

This is why control devices for such traction drives use a law of behavior for the clutch that yields the relation between the position of the clutch command member and the maximum torque that said clutch can transmit. But such laws are progressive over time for various reasons, particularly because the clutch heats up when it is used frequently, or because of wear on it or deviations in manufacturing characteristics.

The progression in the laws of behavior of the clutch are taken into account by establishing procedures to determine the biting point in particular: that is, the position of the command member that allows contact to begin between the two clutch plates.

However, this approach has the drawback of being rather imprecise. Particularly, it is observed that the procedure for determining the biting point is highly sensitive. For this reason, in actual vehicle use, using such a procedure leads to unacceptably rough operation, with the result that it is preferable to retain laws of clutch behavior without factoring in the variations in the biting point. However, it is observed that the clutch control is highly irregular with this approach as well.

SUMMARY OF THE INVENTION

The purpose of the present invention is to remedy this difficulty by proposing a means for adjusting the laws of clutch behavior based on clutch use so as to obtain the best possible modeling of clutch behavior at each instant in order to attain good control of the clutch.

To this end, the object of the invention is a control method for a coupling device between an input shaft driven by a motor and an output shaft that can transmit a maximum torque based on the position of an actuator of the coupling device, in accordance with a time-dependent law of behavior for the coupling means that relates the value of the maximum transmittable torque to the value of the position of the coupling means actuator, according to which at each instant:
- a setpoint is defined for maximum torque to be transmitted;
- the actual position of the actuator of the coupling device is measured;
- using the setpoint for maximum torque to be transmitted, the measurement of the actual position of the actuator, and the law of behavior of the coupling device at the instant under consideration, a setpoint is determined for the coupling device actuator, which is sent to the coupling device actuator.

In order to implement this method:
- at each instant, a law of behavior is used for the coupling means, which is obtained by interpolating between a first reference law of behavior for the coupling means and at least one second reference law of behavior for the coupling means, and
- self-adaptation of the interpolation result for the law of behavior of the coupling means is performed in order to take into account the change in the behavior of the coupling means in response to its use.

Preferably, the self-adaptation procedure is performed on the interpolation result for the law of behavior of the coupling means using an integration with respect to the length of time between open-loop estimation of the maximum torque that the coupling device can transmit at each instant and closed-loop estimation of the torque that the coupling device transmits at each instant.

By preference, at least one interpolation is performed between a first reference law and a second reference law using an interpolation function $\alpha$ to determine a law of intermediate behavior at each instant, and the interpolation function is adjusted with a first gain $K\alpha$.

The interpolation function can be independent of the position of the coupling device actuator.

The interpolation function can also be dependent on the position of the coupling device actuator, and the range of variation of the position of the coupling device actuator is divided into a plurality of intervals, with the interpolation function being adjusted interval by interval. In addition, the interpolation function is smoothed.

By preference, the law of behavior at each instant for the coupling device is equal to the law of intermediate behavior at each instant for the coupling device.

For example, the first reference law is the law of behavior of the coupling means when it is new and cold, and the second reference law is the law of behavior of the coupling means when it is new and warm.

In addition, we interpolate between the law of intermediate behavior and a third reference law, corresponding to the worn coupling device, using an interpolation coefficient $\beta$, which is adjusted by using a second gain $K\beta$ that has an opposite sign to the first gain $K\alpha$, and a low absolute value compared to the first gain.

By preference, the second interpolation coefficient $\beta$ is adjusted continuously throughout the life of the coupling device, and the first coupling coefficient is adjusted each use period of the device by reinitializing it at the beginning of each use period.

The coupling device is a controlled clutch, for example, and it can be incorporated into a traction drive, particularly a hybrid traction drive of a motor vehicle.

The invention also concerns a coupling device comprising the appropriate control means for implementing the method according to the invention. For example, the coupling device is incorporated into the traction drive of a motor vehicle.

The invention will now be described more precisely, but not exhaustively, with reference to the annexed figures, in which:

DETAILED DESCRIPTION OF THE PREFERRED EMBODIMENT

Figure 1:
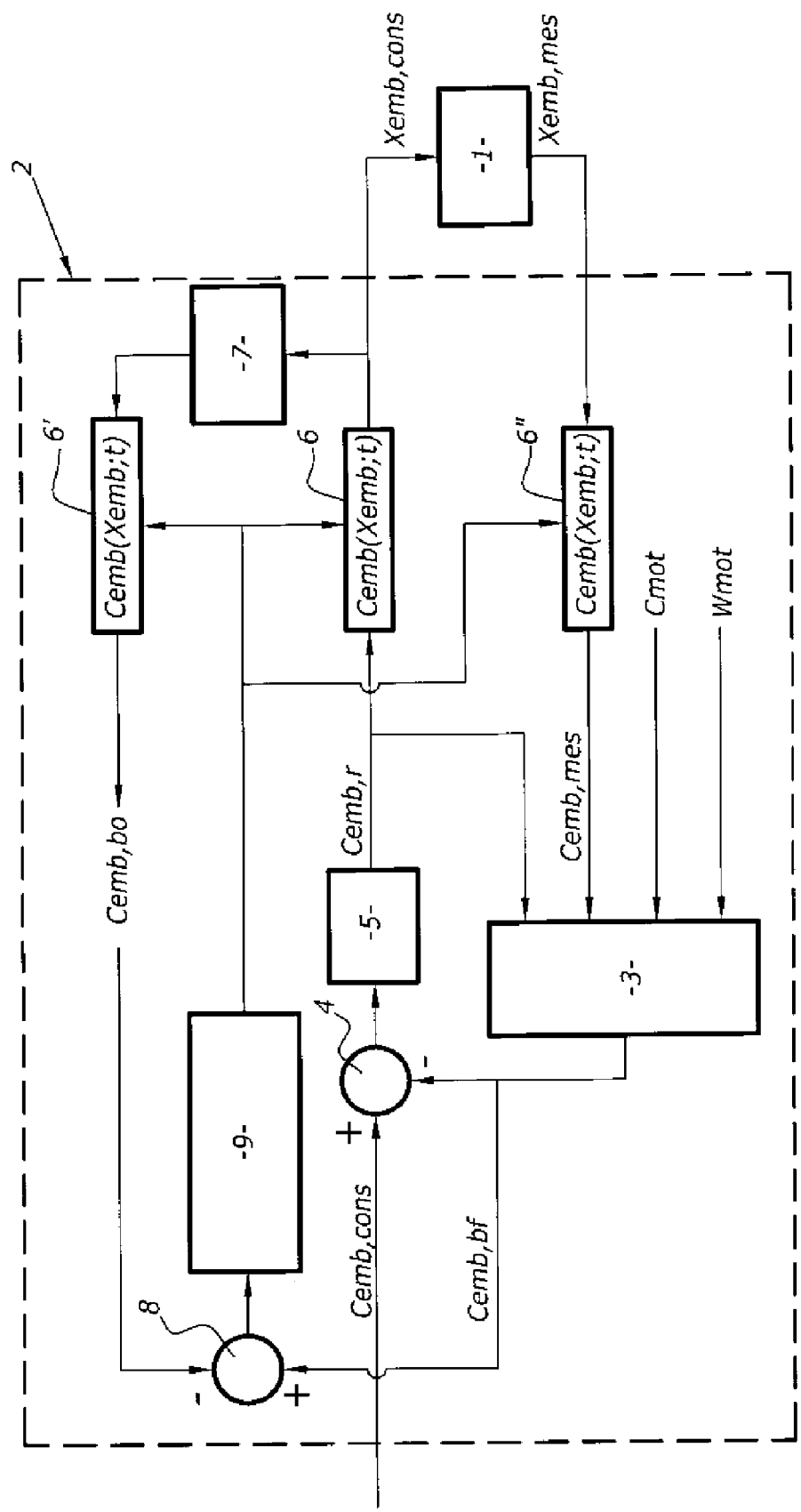
FIG. 1 is a schematic diagram of a clutch control.

To control the controllable clutch 1, a control device is used, generally referenced 2, which transmits to the clutch a position setpoint of the clutch control device Xemb,cons. This clutch control device 2 receives an input torque setpoint for the clutch Cemb,cons. To determine the position setpoint Xemb,cons for the clutch control means, the clutch control device 2 has a first loop, called a "closed loop", that can estimate the torque actually transmitted by the clutch when it is operating in sliding mode, based on a measurement of the actual position of the clutch actuator Xemb,mes and measurements of motor torque Cmot and motor speed Wmot of the drive motor for the input torque of the clutch input shaft; this estimator yields a quantity Cemb,bf that is compared to the clutch setpoint provided by the traction drive control system. Such an estimator is known in itself to those skilled in the art, and uses a dynamic behavior model for the traction drive.

The torque setpoint for the clutch Cemb,cons and the closed-loop estimate of the torque actually transmitted by the clutch Cemb,bf are compared in a first comparator 4 that calculates the difference between these two torques. This difference is input to a module that computes a control torque Cemb,r, which is the torque setpoint that will be used to determine the position setpoint for adjusting the clutch control means. Such a computing module for the control torque is known in itself to those skilled in the art.

The control torque Cemb,r is converted by a module 6 to a position setpoint for the clutch actuator Xemb,cons. The module 6 uses a law of behavior for the clutch at instant t Cemb(Xemb; t) that determines the relation between the maximum torque transmittable by the clutch and the position of the control member.

The actuator position setpoint Xemb,cons is sent to a dynamic clutch modeling module 7 that takes into account the positioning dynamics of the clutch actuation means, and consequently the time gaps, to determine the theoretical position of the clutch command member at instant t. This value is then converted, by a module 6' that uses the same law of behavior as module 6, to an open-loop estimate Cemb,bo of the maximum torque that the clutch could transmit at instant t.

Note that in the closed loop, the measured actual clutch position Xemb,mes is converted to a torque estimate Cemb,mes by a module 6" that uses the same law of clutch behavior.

Note also that the three laws of clutch behavior 6, 6' and 6" are identical at instant t.

In order to take into account changes over time in the clutch behavior, the law used by modules 6, 6' and 6" is adjusted using a self-adaptation procedure that factors in a result from a comparator 8 comparing the open-loop estimate Cemb,bo of the maximum torque that the clutch can transmit at instant t and the closed-loop estimate of the torque actually transmitted by the clutch at instant t Cemb,bf. The difference between these open-loop and closed-loop estimates of the torque transmittable vs. transmitted by the clutch is used to adjust the laws of clutch behavior in a self-adaptation module 9 that performs operations such as integration, using gains that can be adjusted based on the desired adaptation behavior.

The self-adaptation process used to adjust the formulation of the laws of clutch behavior will now be described.

Figure 2:
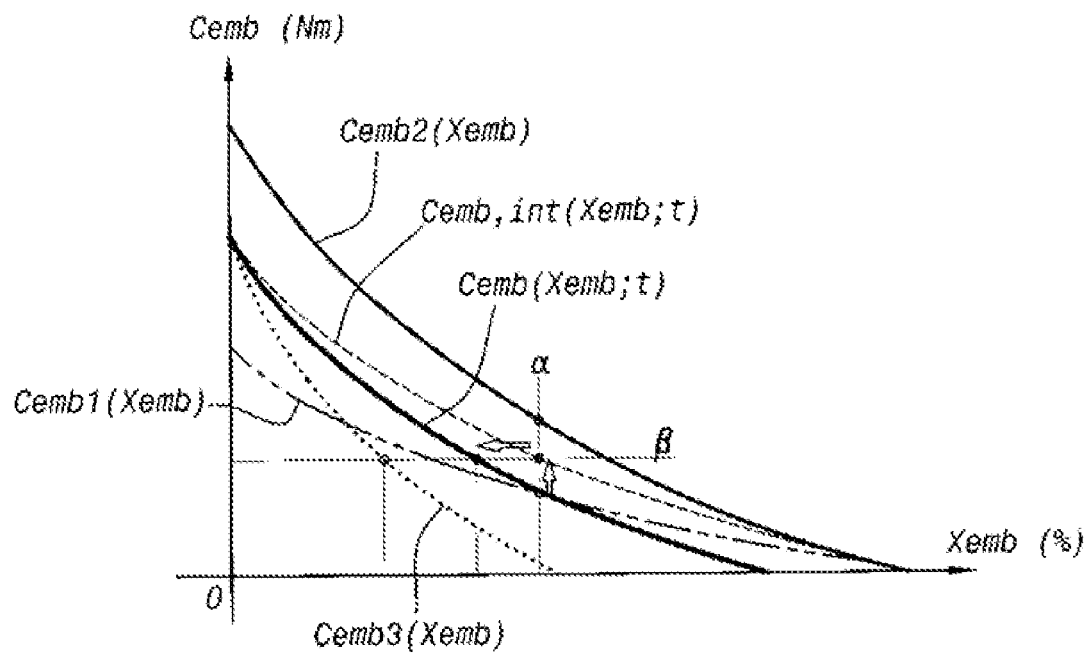
FIG. 2 is a schematic view of the double interpolation principle used in a method for controlling a clutch.

First, referring to FIG. 2, we will define the various laws of clutch behavior to be used.

First, we consider a first law of behavior Cemb1 (Xemb), which is the law of behavior for the clutch when it is new and cold: that is, when the linings are not worn or heated up from being in use. We also consider a second law of clutch behavior Cemb2(Xemb), which corresponds to the behavior of the new clutch when warm: i.e., the new clutch when it has been in use and is at its maximum temperature in use. These two curves are offset from one another because of the expansions occasioned by the clutch heating up. By using a time-dependent interpolation function $\alpha$, which can either be a coefficient or which can depend on the position Xemb of the clutch actuator (or command member), we can determine the law of behavior for the clutch in new condition at a given instant t, i.e., at a certain temperature that depends on the conditions in which the clutch is used. This intermediate law Cembint, (Xemb,t) corresponds to the law of behavior for the clutch in new condition in the actual operating conditions. This law can be written as: Cembint (Xemb,t)=$\alpha$(Xemb,t)×Cemb1 (Xemb)+ [1−$\alpha$(Xemb,t)]×Cemb2(Xemb).

In this formula, $\alpha$(Xemb, t) is expressed very broadly as a function of Xemb. The person skilled in the trade will understand that this function can be constant while Xemb varies. In this case, $\alpha$ is a constant that is simply time-dependent.

Lastly, we use a third law Cemb3(Xemb), which corresponds to the law of behavior for the clutch when it is worn, and which is offset from the other laws, in particular due to wear on the clutch linings, which thus modifies the clutch geometry. This law is characterized by the fact that the point of contact of the two clutch plates is substantially displaced relative to where it is when the clutch is new. Furthermore, the stiffness of the control mechanism and the characteristics of the friction materials gradually change over the life of the clutch.

In order to represent the actual law of clutch behavior to be used at an instant t, which corresponds to actual operating conditions of the clutch and its state of wear, we use a law Cemb(Xemb,t) obtained by interpolating between the law of intermediate clutch behavior and the law of behavior for the worn clutch. To perform this interpolation, we use an interpolation coefficient $\beta$ such that at a maximum torque transmittable by the given clutch, the position Xemb of the actual clutch control means is obtained by linear interpolation between the position setpoints of the clutch control means a) when the clutch is completely worn and b) when the clutch is following the law of intermediate behavior as it has just been defined.

If Xembint (Cemb,t) is the actuator position defined by the intermediate law valid at instant t to obtain a maximum transmittable torque Cemb, Xemb3 (Cemb) is the actuator position defined by the law corresponding to the completely worn clutch, from which we can obtain the same torque, and Xemb (Cemb,t) is the position that must be assigned to the actuator at instant t in order to obtain the torque Cemb, with heating of and wear on the clutch taken into account, then we have:

$$Xemb(Cemb,t)=\beta Xemb,int(Cemb,t)+(1-\beta)Xemb3(Cemb).$$

In light of these different characteristics of the laws of clutch behavior and of the theoretical laws in new-cold, new-warm and worn condition, it appears that by comparing the open-loop setpoint for maximum torque transmitted by the clutch Cemb,bo with the closed-loop estimate of the torque actually transmitted by the clutch Cemb,bf, we can estimate how the interpolations between the various theoretical laws of clutch behavior must vary over time.

In particular, if the closed-loop torque estimate is higher than the open-loop torque estimate, this means that in the interpolation that involves the law of behavior for the new-condition, cold clutch and the law of behavior for the new-condition, warm clutch, gives too much weight to the law of behavior for the new-condition, cold clutch. Given these conditions, it is advisable to decrease the value of the interpolation function $\alpha$.

Actually, the open-loop torque estimate corresponds to the value calculated from the estimated law of clutch behavior, and the closed-loop estimate is close to the actual torque. For this reason, when the closed-loop estimate is higher than the open-loop estimate, we can conclude that the estimated law of clutch behavior underestimates the torque transmitted by the clutch.

In the example under consideration, at given clutch actuator position, the torque calculated for the cold clutch is less than the torque calculated for the warm clutch.

Under these conditions, if the function $\alpha$ is too high, the estimated law of clutch behavior underestimates the torque transmitted.

For this reason, in the case of the example, when the estimated open-loop torque is less than the estimated closed-loop torque, this means that the function $\alpha$ is too high.

Conversely, if the closed-loop torque estimate is less than the open-loop torque estimate, it is advisable to update the interpolation function $\alpha$ in the other direction.

Note that the directions of change indicated here can depend on the way the clutch is built and the way it operates. The person skilled in the art knows how to adjust for all of the specific cases.

Thus, in order to adjust the law of behavior, a procedure for adjusting the interpolation function $\alpha$ is introduced into the control system, which consists of updating this function so that the derivative with respect to time of the value of the function $\alpha$ is proportional to the difference observed between the closed-loop torque estimate and the open-loop torque estimate. The proportionality coefficient is a gain $K_\alpha$.

Such an adjustment—which we will come back to later— has the advantage that it takes into account clutch heating processes: i.e., the processes that occur during a period of clutch use; but it has the disadvantage of not taking wear and tear processes into account.

Wear and tear processes are taken into account by adjusting the coefficient $\beta$ of the second interpolation described above. Arguments similar to those given for adjusting the coefficient $\alpha$ show that the coefficient $\beta$ must be adjusted as a function of the difference between the closed-loop torque estimate and the open-loop torque estimate, inversely to the $\alpha$ function adjustment, and with a much lower rate of adjustment. Thus, to adjust the coefficient $\beta$, we use a law such that the derivative of the coefficient $\beta$ with respect to time is proportional to the difference observed between the closed-loop torque estimate and the open-loop torque estimate, with a proportionality coefficient, or gain $K_\beta$, that is much smaller in absolute value than the coefficient $K_\alpha$, and is opposite in sign to the coefficient $K_\alpha$. Combining these two adjustments yields a behavior curve Cemb(Xemb, t) that takes into account both clutch heating and wear.

Given that clutch heating is a variable process that occurs only during periods of clutch use and disappears when the clutch is left for a certain time at rest, and that the wear and tear process is an ongoing process, the interpolation function $\alpha$ and the interpolation coefficient $\beta$ adjustments are different.

In particular, the interpolation results using the interpolation function $\alpha$ are zeroed out after each period where the clutch is not in use for a long enough time that its temperature returns to normal. In contrast, the coefficient $\beta$ adjustments are cumulative over the life of the clutch.

Proceeding in this manner, we obtain clutch behavior curves that are self-adapted, based not only on instantaneous clutch use, but also on prior use. For this reason, this approach yields a clutch control law that corresponds to the actual state of the clutch at the moment it is used.

As previously indicated, the interpolation between the law of intermediate clutch behavior and the law of clutch behavior when it is completely worn out is performed with a single interpolation coefficient $\beta$. In contrast, interpolating between a law of behavior for the new clutch and a law of behavior for the heated clutch is preferably done with an interpolation that is not constant over the entire range of operation of the clutch, but is performed operating interval by clutch operating interval, as will now be explained; and for this reason, instead of an interpolation coefficient, we use an interpolation function $\alpha$(Xemb, t), which not only varies over time like the coefficient $\beta$, but which additionally depends on the position Xemb of the clutch control member.

Figure 3:
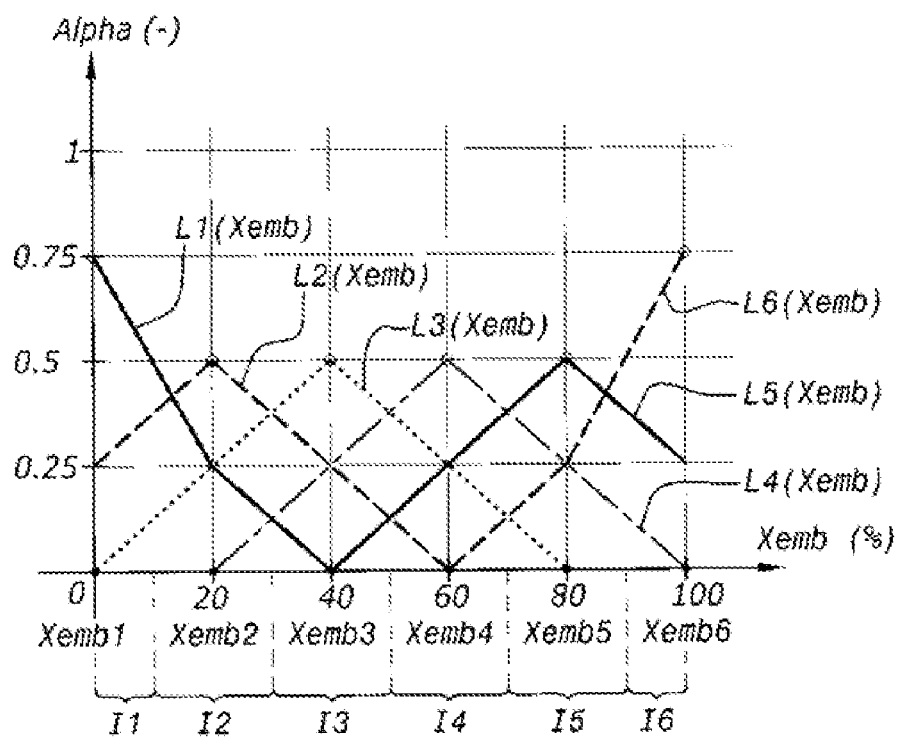
FIG. 3 is a schematic representation of the interpolation functions used in a method for controlling a clutch.

As shown in FIG. 3, to achieve this, we divide the position variation range of the clutch control means Xemb into a certain number of segments, e.g. six segments, as indicated in the figure: a first segment I1 spanning the interval between 0 and 10%, a second segment I2 centered on 20%, which corresponds to the interval between 10 and 30%, an interval I3 centered on 40%, an interval $I_4$ centered on 60%, an interval $I_5$ centered on 80%, and an interval $I_6$ that goes from 90 to 100%. For each of these intervals, we can define an interpolation coefficient: $\alpha$0 for the first interval, $\alpha$20 for the second interval, $\alpha$40 for the third interval, $\alpha$60 for the fourth, $\alpha$80 for the fifth, and $\alpha$100 for the last interval. We also define smoothing functions, shown in FIG. 3, corresponding to each of the intervals, such that the sum of these smoothing functions for any setpoint of the clutch control means is equal to 1. These functions are called $L_1$(Xemb), $L_2$(Xemb), $L_3$(Xemb), $L_4$(Xemb), $L_5$(Xemb), and $L_6$(Xemb), respectively. Each smoothing function results in a weighting across the interval $I_x$ to which it is applied, and across the adjacent intervals $I_{x-1}$ and $I_{x+1}$, thereby providing a smoothing function. Then we define the global interpolation function $\alpha$(Xemb), equal to the sum of the products of the interpolation coefficients and the smoothing functions for the corresponding intervals: $\alpha$(Xemb)=$\alpha$0×L1(Xemb)+$\alpha$20×L2(Xemb)+ . . . +$\alpha$100×L6 (Xemb).

To perform the adjustment, at each instant t, we determine which operating interval the clutch is in, and we adjust the coefficient αi for the corresponding interval. Over the life of the clutch, we thus adjust the various interpolation coefficients interval by interval and introduce them into the formula that defines the interpolation function, which makes it possible to adjust this interpolation function. This segment interpolation is done only for the coefficient α, which takes into account the clutch heating factor. The heating process does indeed have effects that are a function of the clutch operating range. Using these smoothing functions as described has the advantage of preventing this self-adaptation by segments from producing fluctuations when updating the calculated clutch behavior law, which could lead to problems with clutch control. In particular, this smoothing prevents non-monotonicities in the law of clutch behavior, which would produce impossible reversals.

Figure 4:
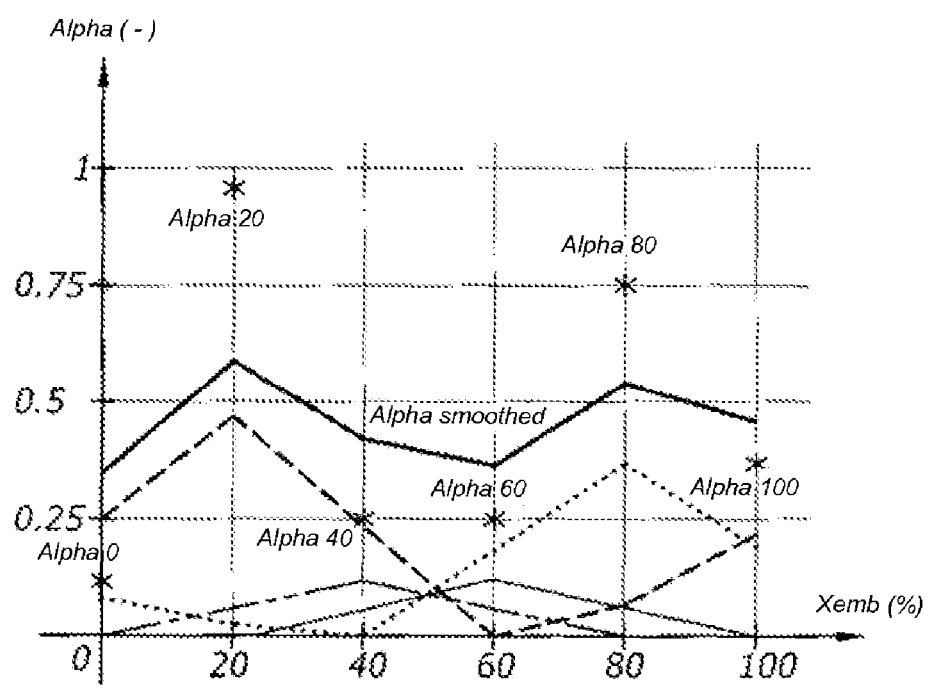
FIG. 4 is a schematic representation of the interpolation functions used for controlling a clutch after a certain period of use.

FIG. 4 gives an example of the interpolation curves after some adjustment, and as we can see, the interpolation coefficients α0, α20, α40, α60, etc., have changed substantially relative to the initialization value, which was 0.5, with the result that the weight of each of the smoothing laws has changed significantly, which yields the smoothed interpolation function shown in FIG. 4.

The self-adaptation method that has just been described takes into account two interpolations, one corresponding to clutch heating and the other to wear and tear. In addition, one of the interpolations is complex, since it is performed by segment. But simpler self-adaptations can be done, e.g., by performing just one interpolation and using one law for the new, heated clutch and the worn clutch, and/or by not segmenting one of the interpolations.

This method can be implemented by a control device that includes a computer suitable for controlling a coupling/decoupling device such as a clutch in a traction drive, e.g. for a vehicle, in particular a motor vehicle.

The invention claimed is:

1. Method for controlling a coupling device between an input shaft driven by a motor and an output shaft that can transmit a maximum torque based on the position of an actuator of the coupling device, in accordance with a time-dependent law of behavior of the coupling means according to which, at each instant:
    a setpoint is defined for maximum torque to be transmitted;
    the actual position of the actuator of the coupling device is measured;
    using the setpoint for maximum torque to be transmitted the actual measurement of the position of the actuator and the law of behavior of the coupling means at instant t a setpoint is determined for the coupling device actuator, which is sent to the coupling device actuator,
    wherein:
    the law of behavior of the coupling means at instant t is obtained by interpolating between a first reference law of behavior for the coupling means and at least one second reference law of behavior for the coupling means; and
    self-adaptation of an interpolation result for the law of behavior of the coupling means is performed in order to take into account the a change in behavior of the coupling means in response to its use,
    wherein a first interpolation is performed between a first reference law and a second reference law using a first interpolation function a to determine a law of intermediate behavior at instant t, which is used to determine the law of behavior of the coupling means, and the first interpolation function is adjusted with a first gain,
    wherein the first reference law is the law of behavior of the coupling means when it is new and cold, and the second reference law is the law of behavior of the coupling means when it is new and warm,
    and wherein a second interpolation is performed between the law of intermediate behavior at instant t and a third reference law corresponding to the worn coupling device, using a second interpolation coefficient, and the second interpolation coefficient is adjusted by using a second gain that has an opposite sign to the first gain, and a low absolute value compared to the first gain.

2. Method according to claim 1, wherein the self-adaptation procedure is performed on the interpolation result for the law of behavior of the coupling means by integrating a difference between an open-loop estimate of the maximum torque that the coupling device can transmit at instant t and a closed-loop estimate of the torque that the coupling device transmits at instant t.

3. Method according to claim 1, wherein the interpolation function is independent of the position of the coupling device actuator.

4. Method according to claim 1, wherein the first interpolation function is dependent on the position of the coupling device actuator, a range of variation of the position of the coupling device actuator is divided into a plurality of intervals, and the first interpolation function is adjusted interval by interval.

5. Method according to claim 4, wherein the first interpolation function is smoothed.

6. Method according to claim 1, wherein the law of behavior at instant t of the coupling device is equal to the law of intermediate behavior at instant t of the coupling device.

7. Method according to claim 1, wherein the second interpolation coefficient is adjusted continuously throughout the life of the coupling device, and the first interpolation function is adjusted at each use period of the device by reinitializing it at the beginning of each use period.

8. Method according to claim 1, wherein the coupling device is a controlled clutch.

9. Method according to claim 1, wherein the coupling device is incorporated into a traction drive of a motor vehicle.

10. Coupling device between an input shaft and an output shaft including a control means, wherein the control means implements the method according to claim 1.

11. Coupling device according to claim 10, which is incorporated into the traction drive of a motor vehicle.

12. Method according to claim 1, wherein the coupling device is incorporated into a hybrid traction drive of a motor vehicle.

13. Coupling device according to claim 10, wherein the coupling device is a clutch.

* * * * *